United States Patent [19]
Marlowe et al.

[11] Patent Number: 4,932,716
[45] Date of Patent: Jun. 12, 1990

[54] HIGHWAY TRUCK-TRACTOR

[75] Inventors: Huston Marlowe, Orinda; John Lindsley, Felton, both of Calif.

[73] Assignee: Paccar Inc., Bellevue, Wash.

[21] Appl. No.: 244,950

[22] Filed: Sep. 15, 1988

[51] Int. Cl.$^5$ ............................................ B62D 33/06
[52] U.S. Cl. ................................................ 296/180.2
[58] Field of Search ........................... 296/180.2, 190; 180/69.21, 89.1, 89.11, 89.19

[56] References Cited

U.S. PATENT DOCUMENTS

| 3,945,677 | 3/1976 | Servais et al. | 296/180.2 |
| 4,142,755 | 3/1979 | Keedy | 296/180.2 |
| 4,436,177 | 3/1984 | Elliston | 296/190 |
| 4,775,179 | 10/1988 | Riggs | 296/190 |

FOREIGN PATENT DOCUMENTS 150823  7/1986  Japan .................................. 296/180.2

Primary Examiner—Robert R. Song
Attorney, Agent, or Firm—Flehr, Hohbach, Test, Albritton & Herbert

[57] ABSTRACT

A truck including a cab having a front windshield, opposite driver and passenger doors, a cab roof, and a roof fairing disengageably mounted to the cab roof is disclosed herein. The windshield, cab roof and roof fairing are configured so that they present a substantially smooth outer front and side joints between their adjacent outer surfaces, whereby to enhance the aerodynamic qualities of the cab. In the actual embodiment disclosed, the truck is of the conventional class 7 or 8 type as opposed to the cab-over-engine type of truck and is designed so that its opposite driver and passenger doors are located behind the driver and passenger seats rather than directly beside them. At the same time, both the truck's hood and its windshield wrap around the cab to points adjacent these mid-position doors. The hood is pivotally mounted to the cab and opens up and rearward.

29 Claims, 6 Drawing Sheets

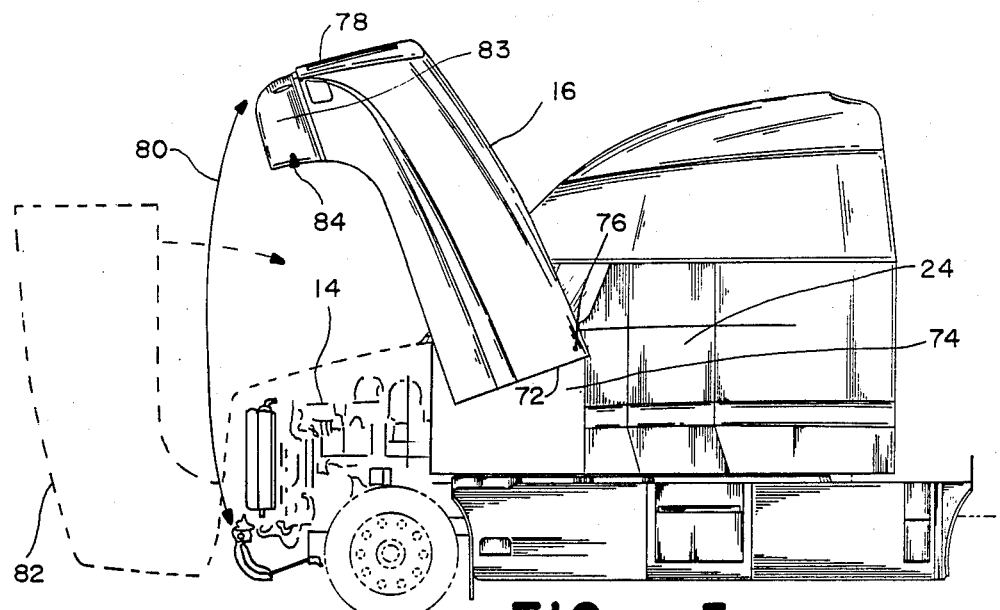
FIG.—5
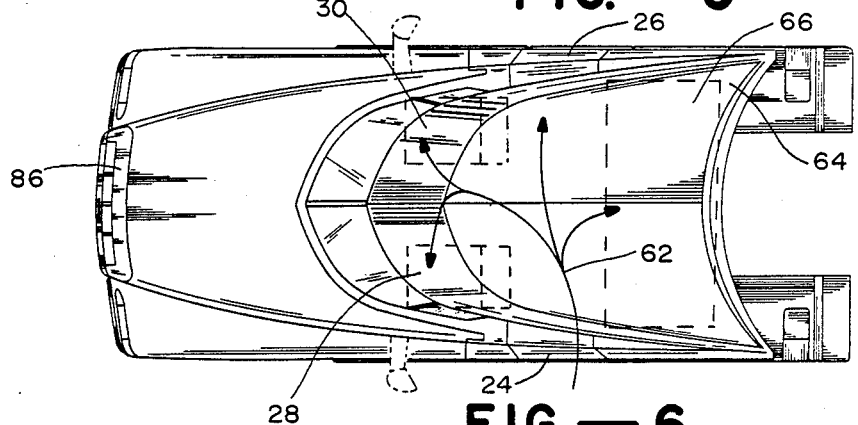
FIG.—6
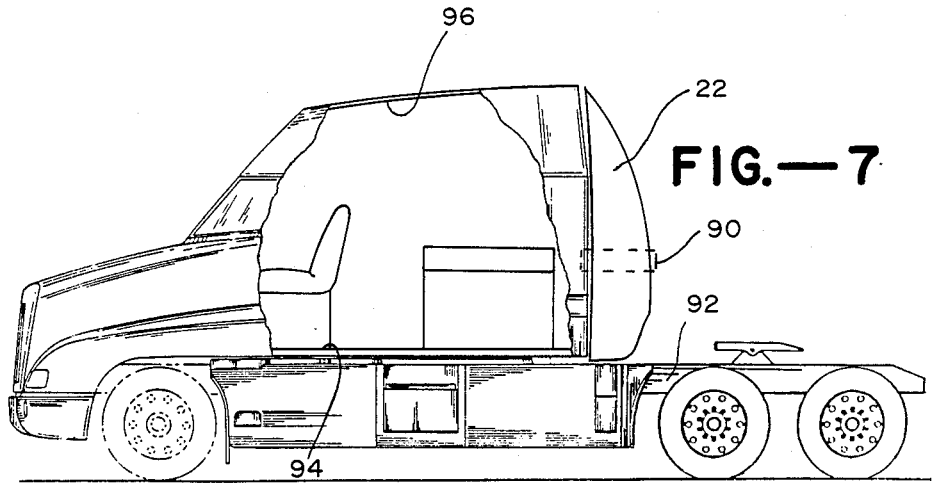
FIG.—7

HIGHWAY TRUCK-TRACTOR

The present invention relates generally to trucks and more particularly to an aerodynamically enhanced truck and specifically the class 7 or 8 truck of the conventional type having its cab located behind the truck engine, but one including particularly designed integral aerodynamic and mechanical features, mid-position driver and passenger doors, a cab-mounted tilting hood and a wrap around windshield.

The utilization of a fairing mounted to the roof of a truck cab for reducing drag is well known in the art. One example of a separately mounted fairing can be seen in Mason U.S. Pat. No. 3,972,556. Another example can be found in Buckley U.S. Pat. No. 4,245,862. In each of these cases, the roof fairing is designed as a separate and distinct component from the roof itself and together the roof and fairing present a series of what may be referred to as interrupted joints between the two. These are joints defined by surfaces that meet abruptly, as distinguished from smooth joints which are those defined by surfaces that meet at a substantially common surface-to-surface tangent across the joint. Applicants have found that the use of interrupted joints seriously compromises the aerodynamic qualities of the overall truck cab.

As will be seen hereinafter, the truck disclosed herein includes a front hood and a cab having a front windshield, opposite driver and passenger doors, a sleeping compartment, a roof and a fairing disengageably mounted on top of the roof. The front windshield extends upward and rearward from the hood at an acute angle with the latter and the cab roof is located above the windshield and includes a forward section thereof extending upward and rearward from the top of the windshield so as to define a windshield-roof joint therebetween. In accordance with one aerodynamic feature of the present invention, the windshield and forward roof section together present a combined windshield-roof surface which extends upward and rearward across the windshield-roof joint in a substantially smooth manner along the entire length of the joint. At the same time, the roof fairing, which is disengageably mounted to the roof, includes a forward section thereof extending upward and rearward from the top of the forward roof section so as to define a forward roof-fairing joint therebetween. In accordance with a second aerodynamic feature of the present invention, the forward roof section and forward fairing section together present a combined forward roof-fairing surface which extends upward and rearward across the forward roof-fairing joint in a substantially smooth manner along the entire length of this last mentioned joint.

The truck disclosed herein also includes other aerodynamic features related to the sides of the hood and the sides of its cab windshield, roof and roof-fairing. First, opposite sides of the cab roof and roof fairing meet at opposite side roof-fairing joints and those adjacent sides together present combined side roof-fairing surfaces which extend upward across their respective roof-fairing joints in a substantially smooth manner along the entire length of each of those joints Further, both of the opposite roof-fairing side surfaces lie on opposite sides of a central ridge which extend from the forward end of the truck's windshield entirely across the windshield, roof and roof-fairing. This ridge divides these latter three components in longitudinal halves so that opposite sides thereof diverge rearwardly and outwardly in a generally symmetrical relationship to one another so as to meet at rearwardmost opposite vertical edges. At the same time, the opposite sides of the truck's hood diverge rearwardly and outwardly in the same general way meeting at the same vertical edges. This further enhances the aerodynamic qualities of the overall truck.

While most of the aerodynamic features described briefly above can be equally incorporated into both class 7 and 8 trucks of the conventional type, that is, one having its cab located behind its engine, as well as a cab-over-engine (COE) type of truck, the actual truck disclosed herein is of the conventional type. With particular regard to a typical class 7 or 8 conventional truck, its cab normally includes driver and passenger doors located immediately to the sides of its driver and passenger seats. At the same time, the truck's front windshield normally extends only across the front of the cab and its hood typically projects out from the cab. As will be seen hereinafter, the truck disclosed herein includes a cab having what may be referred to as mid-position cab doors, that is, doors located aft of the driver and passenger seats. At the same time, the truck's windshield and hood wrap entirely around the forward sides of the cab to positions adjacent to the front edges of the doors This provides a number of advantages to be discussed hereinafter.

The overall truck disclosed herein will be described in more detail hereinafter in conjunction with the drawings wherein:

FIG. 5 is a side elevational view similar to FIG. 1 but illustrating the truck's hood in its raised position;

FIG. 6 is a top plan view similar to FIG. 3 but diagrammatically illustrating the interior of the trucks cab and the way in which an individual can enter the cab through one of its side doors;

FIG. 7 is a side elevational view similar to FIG. 1 but illustrating the interior of the truck cab and also showing its roof fairing carried by fastening to the back of the cab; and FIGS. 8A and 8B diagrammatically illustrate certain aerodynamically related structural features of the truck shown in FIG. 1.

Figure 1:
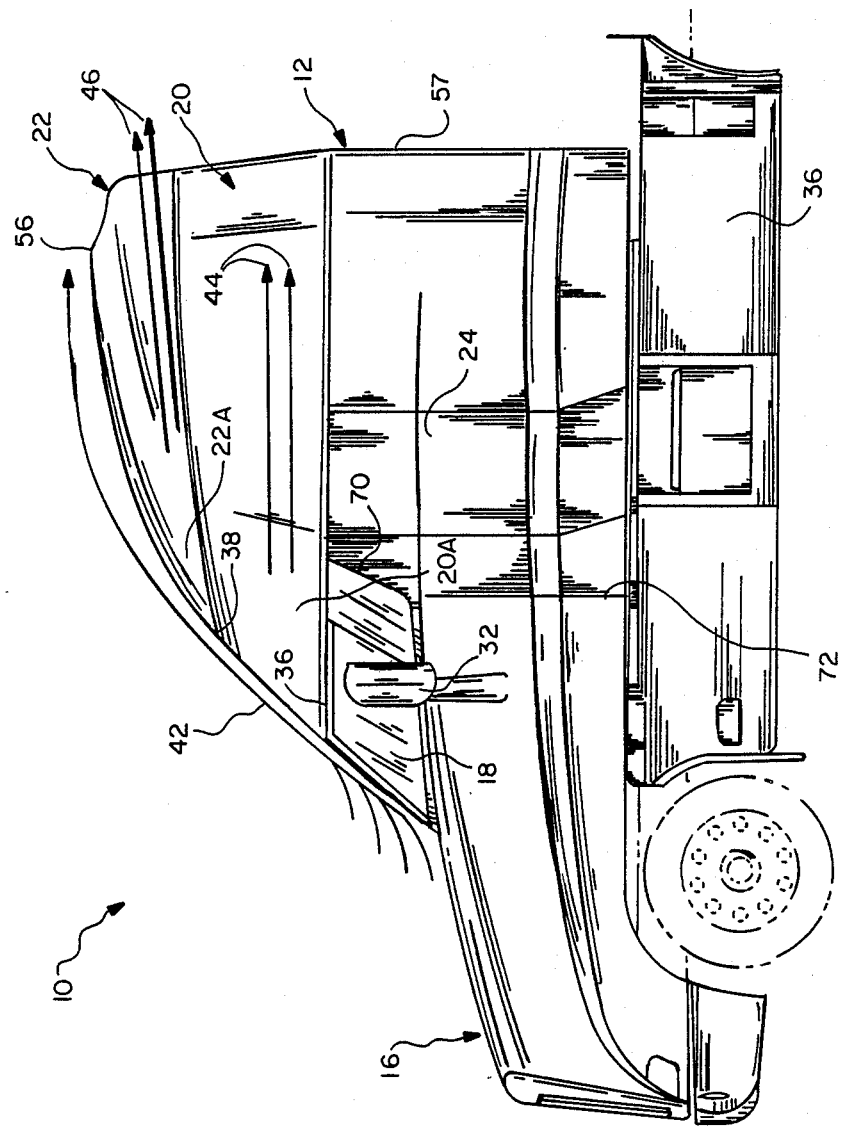
FIG. 1 is a side elevational view of an overall truck designed in accordance with the present invention.

Turning now to the drawings, wherein like components are designated by like reference numerals throughout the various figures, attention is first directed specifically to FIGS. 1-4 which illustrate an overall truck designed in accordance with the present invention and generally designated by the reference numeral 10. In an actual working embodiment, this truck is a class 7 or 8 truck of the conventional type, that is, one having a cab generally indicated at 12 and located behind (as opposed to on top of) its engine which is shown in FIG. 5 at 14. Truck 10 also includes a front hood 16 mounted over engine 14 and also mounted over certain engine-related components (also shown in FIG. 5) for pivotal movement between a lowered closed position and a raised open position. Truck cab 12 is shown including a front windshield 18, a roof 20, and a roof fairing 22 disengageably mounted to roof 20. The cab also supports opposite driver and passenger doors 24 and 26, respectively, and contains driver and passenger seats 28 and 30, respectively, within the cab's interior, as shown in FIG. 6.

In addition to the components described thus far, it is to be understood that overall truck 10 includes other components which may or may not form part of the present invention. For example, the truck includes opposite rearward mirrors 32 and 34 which, as will be discussed, are mounted directly to the hood 16 in accordance with the present invention. On the other hand, the truck's side fairings 36 do not form part of the present invention and will not be described herein. This is also true for engine 14, the various engine related components and other such components that have not been illustrated.

As indicated previously, overall truck 10 has been designed with a number of aerodynamic features. One such feature resides in the combination of windshield 18, roof 20 and roof-fairing-22. As will be seen below, these three separate and distinct components are individually manufactured but are designed in accordance with the present invention to connect together to form an integrated, aerodynamic arrangement having outer front and side joints, all of which are smooth joints, as contrasted with interrupted joints. The term "smooth joints", as used herein, will be defined hereinafter. For the moment, it suffices to say that a smooth joint is one which allows air to flow from one surface to an adjacent surface across the joint therebetween in a substantially smooth, uninterrupted manner, whereby to minimize drag at the joint. This is particularly important for the front, sides and top of a truck cab when the truck is moving forward at relatively high speeds. As a result of these smooth joints and because of the shape of the windshield, roof and roof-fairing, this combined arrangement presents what may be characterized as a single integrated cab fairing for purposes of minimizing drag as the truck moves forward.

Figure 2:
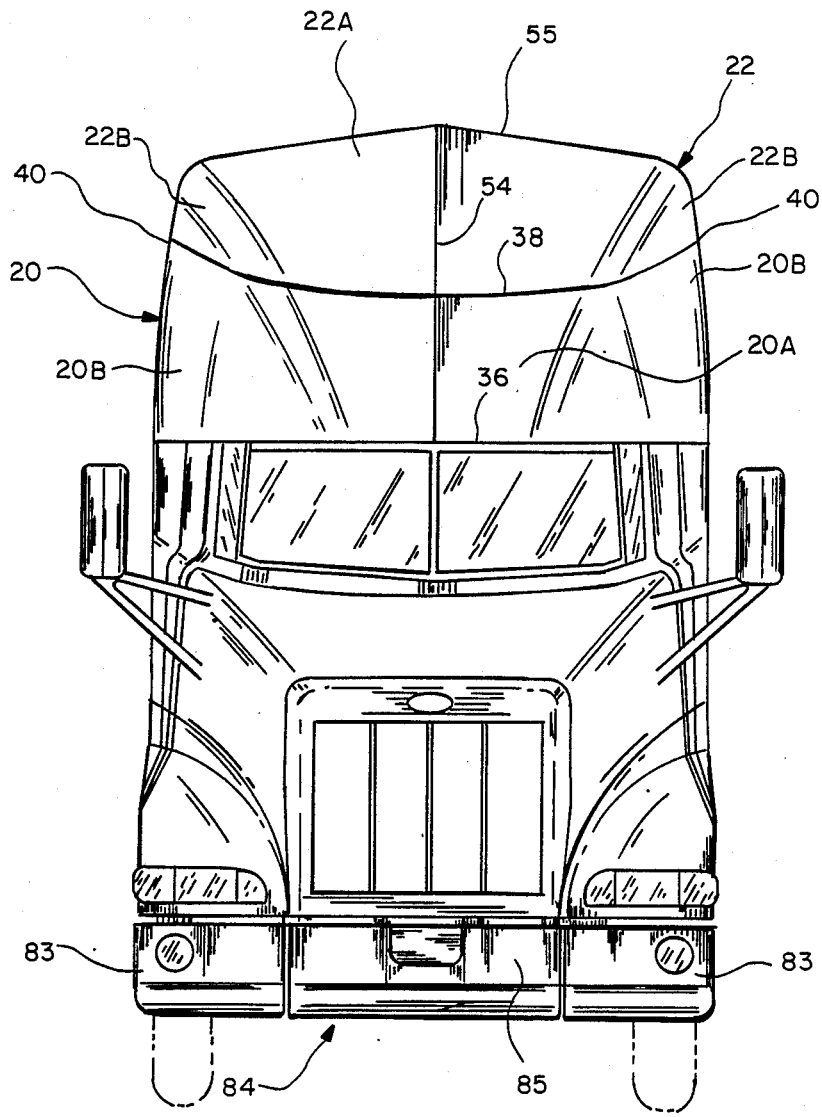
FIG. 2 is a front elevational view of the truck shown in FIG. 1.
Figure 3:
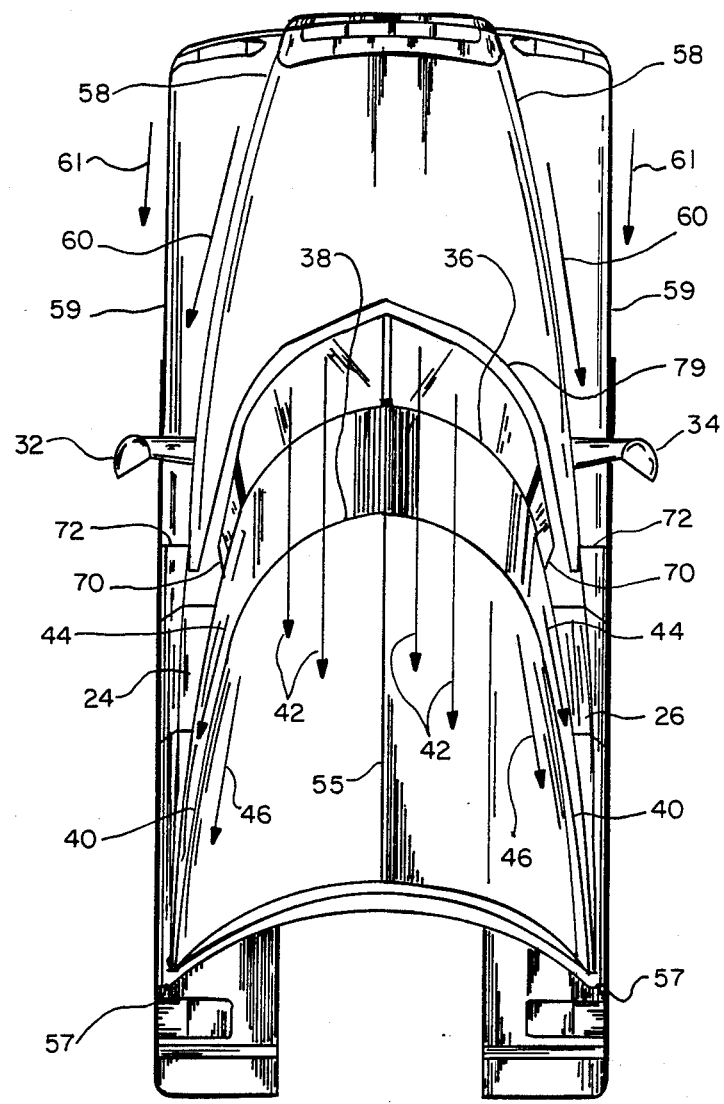
FIG. 3 is a top plan view of the overall truck shown in FIG. 1.

As best illustrated in FIG. 1, the front windshield 18 extends upward and rearward from hood 16 at an acute angle with the latter. The cab roof 20 is located above the windshield and includes a forward roof section 20A extending upward and rearward from the top of the windshield so as to define a windshield-roof joint 36 therebetween. As best illustrated in FIG. 2 and 3, this joint extends along the entire upper edge of windshield 18 and the entire windshield and forward roof section 20A together present a combined windshield-roof surface which extends upward and rearward across windshield-roof joint 36 in a substantially smooth manner along the entire length of that joint. At the same time, roof fairing 22 includes a forward section 22A extending upward and rearward from the top of forward roof section 20A so as to define a forward roof-fairing joint 38 therebetween. Forward roof section 20A and forward fairing section 22A together present a combined forward roof-fairing surface which extends upward and rearward across forward roof fairing joint 38 in a substantially smooth manner along the entire length of this last mentioned joint in the same manner as joint 36.

Still referring to FIGS. 1-4 and particularly FIG. 2, cab roof 20 is shown including opposite upwardly extending side sections 20B located rearward of its forward section 20A and rearward of windshield 18. At the same time, roof fairing 22 is shown including opposite side sections 22B, each of which extends upward from a corresponding one of the roof side sections 20B so as to define a side roof-fairing joint 40 therebetween. Each of these side roof sections and corresponding side fairing sections together present a combined side roof-fairing surface which extends upward across its side-roof fairing joint in a substantially smooth manner along the entire length of that joint.

Referring especially to FIGS. 1 and 3, attention is directed to the way in which windshield 18, roof 20 and roof fairing 22 together present a series of interconnected, continuous front, side and top surfaces which together serve as a single integrated fairing, at least functionally. In FIG. 1, for example, there is shown an arrow 42 which represents one path taken by the flow of air as the truck moves forward. Note specifically that this air flow path starts at the windshield, moves up the latter and across joint 36 without disruption there. It then moves across forward section 20A of roof fairing 20 and smoothly across joint 38, again without disruption there, and finally rearwardly across the forward section 22A of fairing 22. A series of these flow paths spaced laterally cross windshield 36, roof section 20A and fairing section 22A are represented by the group of arrows 42 in FIG. 3. At the same time, arrows 44 and 46 depict air flow paths rearwardly across roof side sections 20B and fairing side sections 22B, respectively. These flow paths are also illustrated in FIG. 1. In all of these cases, the flow paths are continuous and smooth and are subjected to at most minimal disruptions across the joints at the windshield, roof and roof-fairing, thereby minimizing drag across these surfaces, and establishing optimal flow directions for reattachment of air flow on the trailer sides and top.

Since the continuous nature of the front and side joints 36, 38 and 40 is so important, attention is directed to FIG. 8A and 8B for a more detailed understanding of those continuous joints. Referring first to FIG. 8A, the overall cab roof arrangement made up of windshield 18, roof 20 and fairing 22 is shown in dotted lines, specifically illustrated joints 36 and 38. At any point across each of these joints in the direction of air flow (rearward), the immediately adjacent surfaces on opposite sides of each joint together define a common surface-to-surface tangent. One such tangent is diagrammatically illustrated across joint 36 by means of arrow 50. Another such tangent is diagrammatically depicted across joint 38 by arrow 52. In FIG. 8B, similar common surface-to-surface tangents are shown across side joints 40, as depicted by arrows 54.

The discussion immediately above in conjunction with FIGS. 8A and 8B has been provided as a definition herein for the term "continuous joint". Thus, the continuous joint as used herein is one in which the immediately adjacent surfaces defining a joint also defines the common surface-to-surface tangent across the joint. The purpose of such a joint is to allow for the flow of air from one surface to the other across the joint with little or no disruption of air flow. Therefore, it is to be understood that the joint does not have to be perfectly smooth or precisely define a surface-to-surface tangent but sufficiently smooth to present substantially no air flow disruption.

Figure 4:
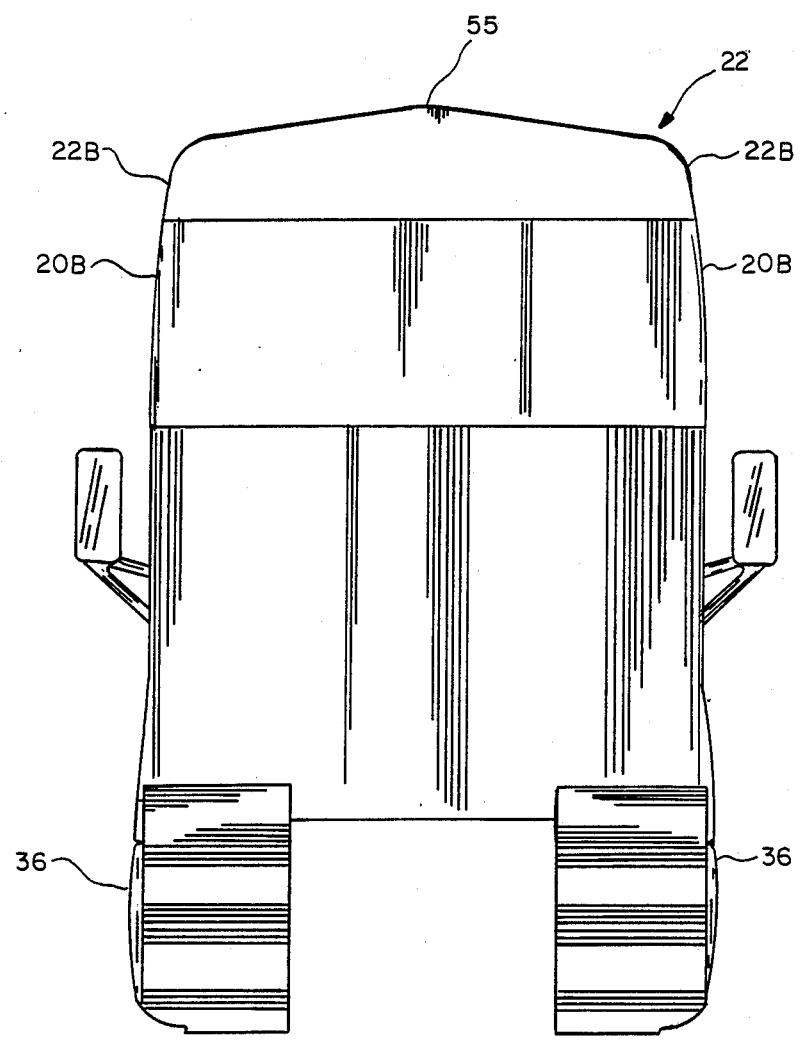
FIG. 4 is a back elevational view of the overall truck shown in FIG. 1.

Returning to FIGS. 1-4, additional aerodynamic features of overall truck 10 will now be pointed out. First, it should be noted that the common surface presented by windshield 18 and forward section 20A of roof 20 provides not only a smooth joint therebetween, but the surface itself all the way up to joint 38 is substantially straight in the direction of its various flow paths 42. It is not until these flow paths reach the joint 38 that they begin to curve rearwardly and they do so in a gentle manner, as best illustrated in FIG. 1. Moreover, as best illustrated in FIGS. 2-4, the combined windshield-roof surface and the combined forward roof-fairing surface together include an upwardly projecting ridge 55 located centrally between and parallel with the opposite sides of the overall truck. This ridge extends from hood 16 across the windshield, across the roof, and across the roof fairing to the point 56 (see FIG. 1) near the back end of the fairing. This ridge serves as a guide or a vane for the rearward flow of air across the top of the truck as the truck moves forward. As best seen in FIG. 3, this ridge divides the windshield, roof and roof-fairing into opposite halves which diverge rearwardly in a substantially symmetrical relationship with one another and meet at rearwardmost opposite vertical edges 57 (see FIG. 3). This includes side sections 20B of roof 20 and side sections 22B of fairing 22. Note also that the opposite sides 58 of hood 16 diverge rearwardly in the same general relationship with the windshield, roof and roof-fairing and meet at vertical edges 57. This is also true for the outermost parallel sides 59 of the truck, that is, they terminate at edges 57. As a result, the sides of the hood 58 present aerodynamic surfaces for the rearward flow of air, as depicted by arrows 60 and outermost sides 59 present aerodynamic surface depicted by arrows 61. These various aerodynamic surfaces (at the different elevations) form gentle, streamlines to move air (at their elevation) to attach to trailer sides. This includes the surfaces depicted by arrows 42, 44, 46, 60 and 61.

Turning now to FIGS. 5-7 in conjunction with FIGS. 1-4, attention is directed to additional features of overall truck 10. First, it should be noted that driver and passenger doors 24 and 26 are located rearwardly of driver and passenger seats 28 and 30, as best illustrated in FIG. 6. This allows the trucker or a passenger to easily enter cab 12 behind the seats, as diagrammatically illustrated in FIG. 6 by means of arrow 62. Note specifically that cab 12 includes a sleeper section 64 including a bed generally represented at 66. This sleeper section is located rearwardly of doors 24 and 26 so as not to obstruct access into and out of the cab, again as depicted by arrow 62. Thus, the trucker can carry equipment, suitcases and the like into and out of the truck cab easily, without first having to move around the seats within the cab.

Overall truck 10 includes a number of additional design features which result from placing doors 24 and 26 in the above described mid positions on cab 12. As best seen in FIGS. 1-4, windshield 18 wraps all the way around the sides of the cab so that its rearwardmost back edges 70 (see FIGS. 1 and 3) are in close proximity to and in front of the front edges of cab doors 24 and 26 so that door posts and A-type pillars (A-posts) are eliminated. The driver is provided with a more panoramic unobstructed view than would otherwise be possible if the side doors were closer to the front of the cab and door posts and A-type pillars were used. Hood 16 also wraps around the front sides of cab 12. More specifically, the side sections 58 of the hood extend from in front of the cab rearwardly along opposite sides of the cab so as to provide opposite rearwardmost back edges 72 (see FIGS. 1 and 3) located in close proximity to and in front of the front sides of the cab doors when the hood is closed. This helps to insulate the lower front sides of the cab where the driver and passenger sit. One such side is shown in FIG. 5 at 74 since the hood is shown in its opened position in that figure.

Still referring to FIG. 5, it is important to note that hood 16 is mounted directly to cab 12 for pivotal movement between its closed and opened positions at opposite pivot points located near the uppermost ends of the rearwardmost back edges 72 of the hood. One such pivot point is shown at 76. A similar pivot point is aligned on the opposite side of the truck and suitable means (not shown) are actually provided for pivotally connecting the hood to the cab at these points. As illustrated in FIG. 5, by supporting hood 16 to cab 12 at points 76, the very front of the hood indicated at 78 moves substantially vertically upward before moving rearward as the hood moves from its closed position to its opened position, as indicated by arrow 80. The hood moves from its opened position to its closed position in the same manner, that is, first forward and then generally vertically downward. By cab mounting a hood in this way, it is not necessary to have any more than a minimal amount of space in front of the truck in order to open and close the hood. This is to be contrasted with conventional truck hoods that tilt forward, as indicated by dotted lines at 82 in FIG. 5. It should be obvious that this latter type of hood requires a relatively large amount of front space in order to open and close, and blocks direct service access to the front of the radiator, front suspension and steering gear. Another feature of the present hood mounting arrangement is that because the hood pivots are placed high and very far aft in the open position its lowermost edges are high and aft for free engine compartment service equipment approach.

Because of the way in which hood side sections 58 extend rearwardly all the way to the mid position doors and thus directly adjacent the driver and passenger seats, rearview mirrors 32 and 34 can be mounted directly to the hood, as shown.

With particular regard to the hood configuration, it should be noted that the back top edge of the hood is specifically contoured with respect to the windshield and roof to move up and over both as the hood is opened.

Still referring to FIG. 5, a further design feature of overall truck 10 resides in the integration of its front bumper 84 with the rest of hood 16 including its front grille 86. Note from FIGS. 2 and 5 that opposite side sections 83 of bumper 84 are connected to and move with the hood between its open and closed position. The center section 85 (FIG. 2) is formed from the front frame cross member of the chassis and protrudes out slightly further than section 83.

Turning now to FIG. 7, overall truck 10 is shown without its fairing 22 mounted to roof 20. Rather, the fairing is shown supported in an upstanding position to and directly behind cab 12 by suitable means, for example, straps 90 shown in dotted lines. Note specifically that the overall length of the roof-fairing 22 is approximately equal to the height of cab 12 from the truck chassis 92 to the top of roof 20. In this way, the fairing does not project up beyond the roof when the truck is decked onto another truck during towing. At the same time, it can be moved from the roof and stored in the manner shown in FIG. 7 during towing. The overall interior height within cab 12 from its floor 94 to its ceiling 96 is far greater than the typical standup space of 6', whereby to provide a new feature relating to standing room. Specifically, the driver and the passenger can easily enter and leave their seats, as shown by the arrow 62 in FIG. 6 without having to bend down.

We claim:

1. In a truck including an engine and engine-related components, a hood mounted over the engine and engine-related component, and a cab located behind said engine, engine-related components and said hood, the improvement comprising:
   (a) a front windshield extending upward and rearward from said hood at an acute angle with the latter;
   (b) a cab roof located above said windshield and including a forward section thereof extending upward and rearward from the top of said windshield so as to define a windshield-roof joint therebetween, said windshield and said roof section together presenting a combined windshield-roof surface which extends upward and rearward across said windshield-roof joint in a substantially smooth manner along the entire length of said joint; and
   (c) a roof fairing disengageably mounted on said cab roof and including a forward section thereof extending upward and rearward from the top of said forward roof section so as to define a forward roof-fairing joint therebetween, said forward roof section and forward fairing section together presenting a combined forward roof-fairing surface which extends upward and rearward across said forward roof-fairing joint in a substantially smooth manner along the entire length of said last-mentioned joint;
   (d) said cab roof including opposite upwardly extending side sections located rearwardly of its forward section and rearwardly of said windshield, said roof fairing including opposite side sections, each of which extends upward from a corresponding one of said roof side sections so as to define a side roof fairing joint therebetween, each of said side roof sections and corresponding side fairing sections together presenting a combined side roof-fairing surface which extends upward across its side roof-fairing joint in a substantially smooth manner along the entire length of said last-mentioned joint, and
   (e) said combined windshield-roof surface and said combined forward roof-fairing surface together including an outwardly projecting ridge located centrally between and parallel with opposite sides of the overall truck and extending from said hood across the windshield, the roof, and the fairing to a point near the back end of the fairing, whereby to serve as a guide for the rearward flow of air across the top of the truck as the truck moves forward.

2. The improvement according to claim 1 wherein ridge extends upward and rearward from said hood across said windshield-roof joint and to said forward roof-fairing joint in a substantially linear manner and then gently curves rearward therefrom to said point near the back end of the fairing.

3. The improvement according to claim 2 wherein said combined windshield-roof surface and said combined forward roof-fairing surface together provide aerodynamically smooth paths on opposite sides of and generally parallel with said ridge for the rearward flow of air across the top of the truck as the truck moves forward.

4. The improvement according to claim 1 wherein said front windshield meets said hood at a hood-windshield joint and wherein said hood-windshield joint, said windshield-roof joint, and said forward roof-fairing joint diverge rearwardly and outwardly on opposite sides of said ridge in symmetrical relationship to one another and, if extended, would meet at rearwardmost opposite edges of the truck cab.

5. In a truck including a truck cab, the improvement comprising:
   (a) a front windshield;
   (b) a cab roof located above said windshield and including a forward section thereof extending upward and rearward from the top of said windshield so as to define a windshield-roof joint therebetween, said windshield and said roof section together presenting a combined windshield-roof surface which extends upward and rearward across said windshield-roof joint in a substantially smooth manner along the entire length of said joint; and
   (c) a roof fairing disengageably mounted on said cab roof and including a forward section thereof extending upward and rearward from the top of said forward roof section so as to define a forward roof-fairing joint therebetween, said forward roof section and forward fairing section together presenting a combined forward roof-fairing surface which extends upward and rearward across said forward roof-fairing joint in a substantially smooth manner along the entire length of said last-mentioned joint the length of said roof fairing from its front end to its back end being approximately equal to the maximum height of said cab from its floor to the top of its roof and said truck including means for supporting said fairing in an upstanding position to and immediately behind said cab in the event the truck must be decked in order to be towed.

6. The improvement according to claim 5 when said cab roof includes opposite upwardly extending side sections located rearwardly of its forward section and rearwardly of said windshield, and wherein said roof fairing includes opposite side sections, each of which extends upward from a corresponding one of said roof side sections so as to define a side roof-fairing joint therebetween, each of said side roof section and corresponding side fairing section together presenting a combined side roof-fairing surface which extends upward across its side roof-fairing joint in a substantially smooth manner along the entire length of said last-mentioned joint.

7. In a truck including an engine and engine-related components, a hood mounted over the engine and engine-related components and said hood, the improvement comprising:
   (a) a front windshield extending upward and rearward from said hood at an acute angle with the latter;
   (b) a cab roof located above said windshield and including a forward section thereof extending upward and rearward from the top of said windshield so as to define a windshield-roof joint therebetween, said windshield and said roof section together presenting a combined windshield-roof surface which extends upward and rearward across said windshield-roof joint in a substantially smooth manner along the entire length of said joint;
   (c) a roof fairing disengageably mounted on said cab roof and including a forward section thereof extending upward and rearward from the top of said forward roof section so as to define a forward roof-fairing joint therebetween, said forward roof section and forward fairing section together presenting a combined surface which extends upward and rearward across said forward roof-fairing joint in a substantially smooth manner along the entire length of said last-mentioned joint, the length of said roof fairing from its front end into its back end being approximately equal to the maximum height of said cab from its floor to the top of its roof; and (d) means for supporting said fairing in an upstanding position to and immediately behind said cab in the event the truck must be decked in order to be towed.

8. In a truck including an engine and engine-related components, a hood mounted over the engine and engine-related component, and a cab located behind said engine, engine-related components and said hood, the improvement comprising:

(a) a front windshield extending upward and rearward from said hood at an acute angle with the latter;

(b) a cab roof located above said windshield and including a forward section thereof extending upward and rearward from the top of said windshield so as to define a windshield-roof joint therebetween, said windshield and said roof section together presenting a combined windshield-roof surface which extends upward and rearward across said windshield-roof joint in a substantially smooth manner along the entire length of said joint; and (c) a roof fairing disengageably mounted on said cab roof and including a forward section thereof extending upward and rearward from the top of said forward roof section so as to define a forward roof-fairing joint therebetween, said forward roof section and forward fairing section together presenting a combined forward roof-fairing surface which extends upward and rearward across said forward roof-fairing joint in a substantially smooth manner along the entire length of said last-mentioned joint;

(d) said cab including driver and passenger seats within the cab and opposite driver and passenger doors located rearward of said seats, whereby across into said cab through said doors is behind said seats, and (e) said hood including opposite side sections extending from in front of said cab rearwardly along opposite sides of the cab so as to provide opposite rearwardmost back edges in close proximity to and in front of the front edge of said cab doors, when the hood is closed, whereby to help insulate the lower front sides of the cab where the driver and passenger sit.

9. The improvement according to claim 8 wherein said cab includes an interior sleeping area located rearwardly of said seats and said doors, whereby access into said cab through said doors is in front of said sleeping area.

10. The improvement according to claim 8 wherein the distance from the floor within said cab to its ceiling including the area between the driver and passenger seat is at least 6 feet, whereby to provide standing room adjacent to drivers seating and in balance of cab.

11. The improvement according to claim 8 wherein said truck includes means for supporting said hood to said cab for pivotal movement between a closed position and an opened position at pivot points located near the uppermost ends of the rearwardmost back edges of said hood, whereby the forwardmost point on said hood moves substantially vertically upward and then rearward as the hood moves from its closed position to its open position so that it is not necessary to provide much space in front of the truck in order to open the hood, and such that superior service access is provided to the front of the chassis, as well as the engine compartment and firewall.

12. The improvement according to claim 8 wherein said truck includes rearview mirrors mounted directly on said opposite side sections of said hood.

13. The improvement according to claim 8 wherein said truck includes a bumper side sections connected to said hood for movement between its opened and closed positions.

14. The improvement according to claim 8 wherein said front windshield includes opposite side sections extending rearwardly along opposite sides of said cab so as to provide opposite rearwardmost back edges in close proximity to and in front of the front sides of said cab doors, whereby to eliminate the need for a door post or A-type pillar, within the driver's field of view.

15. The improvement according to claim 14 wherein said cab roof and said roof fairing include opposite side sections and wherein the opposite side sections of said roof, said fairing, said hood, and said windshield diverge rearwardly in generally symmetrical relationship to one another and, if extended would meet at rearwardmost opposite edges of the truck cab.

16. The improvement according to claim 14 wherein said truck includes a frontmost grille and wherein said diverging side sections of said hood extend from opposite sides of grille to their rearwardmost back edges.

17. In a truck of the Class 8 or 9 type including an engine and engine-related components, a cab located behind the engine, and driver and passenger seats within the cab, the improvement comprising:

(a) opposite driver and passenger doors forming part of said cab and located rearward of said driver and passenger seats, whereby access into said cab through said doors is behind said seats; and (b) a hood mounted over said engine and engine-related components in front of said cab, said hood including opposite side sections extending from in front of said cab rearwardly along opposite sides of the cab so as to provide opposite rearwardmost back edges in close proximity to and in front of the front sides of said cab doors when the hood is closed, whereby to help insulate the lower front sides of the cab where the driver and passenger sit.

18. An improvement according to claim 17 wherein said truck includes means for supporting said hood to said cab for pivotal movement between and closed position and an opened position at pivot points located near the uppermost ends of the rearwardmost back edges of said hood, whereby the forwardmost point on said hood moves substantially vertically upward and then rearward as the hood moves from its closed position to its open position so that it is not necessary to provide much space in front of the truck in order to open the hood, and such that superior service access is provided to the front of the chassis as well as the engine compartment and firewall.

19. The improvement according to claim 17 wherein said truck includes rearview mirrors, mounted directly on said opposite side sections of said hood.

20. The improvement according to claim 17 wherein said truck includes a bumper assembly connected to said hood for movement between its opened and closed positions.

21. The improvement according to claim 17 wherein said truck includes a front windshield having opposite side sections extending rearwardly along opposite sides of said cab so as to provide opposite rearwardmost back edges in close proximity to and in front of the sides of said cab doors, whereby to eliminate the need for a door post or A-type pillar.

22. In a truck including an engine and engine-related components, a hood mounted over the engine and engine-related component, and a cab located behind said engine, engine-related components and said hood, the improvement comprising:
   (a) a front windshield extending upward and rearward from said hood at an acute angle with the latter;
   (b) a cab roof located above said windshield and including a forward section thereof extending upward and rearward from the top of said windshield so as to define a windshield-roof joint therebetween, said windshield and said roof section together presenting a combined windshield-roof surface which extends upward and rearward across said windshield-roof joint in a substantially smooth manner along the entire length of said joint; and
   (c) a roof fairing disengageably mounted on said cab roof and including a forward section thereof extending upward and rearward from the top of said forward roof section so as to define a forward roof-fairing joint therebetween said forward roof section and forward fairing section together presenting a combined forward roof-fairing surface which extends upward and rearward across said forward roof-fairing joint in a substantially smooth manner along the entire length of said last-mentioned joint; and
   (d) said combined windshield-roof surface and said combined forward roof-fairing surface together including a forward and upward projecting ridge located centrally between and parallel with opposite sides of the overall truck and extending from said hood across the windshield, the roof, and the fairing to a point near the back end of the fairing, whereby to serve as a guide for the rearward flow of air across the top of the truck as the truck moves forward.

23. The improvement according to claim 22 wherein ridge extends upward and rearward from said hood across said windshield-roof joint and to said forward roof-fairing joint in a substantially linear manner and then gently curves rearward therefrom to said point near the back end of the fairing.

24. The improvement according to claim 23 wherein said combined windshield-roof surface and said combined forward roof-fairing surface together provide aerodynamically smooth paths on opposite sides of and generally parallel with said ridge for the rearward flow of air across the top of the truck as the truck moves forward.

25. In a truck including an engine and engine-related components, a hood mounted over the engine and engine-related component, and a cab located behind said engine, engine-related components and said hood, the improvement comprising:
   (a) a front windshield extending upward and rearward from said hood at an acute angle with the latter;
   (b) a cab roof located above said windshield and including a forward section thereof extending upward and rearward from the top of said windshield so as to define a windshield-roof joint therebetween, said windshield and said roof section together presenting a combined windshield-roof surface which extends upward and rearward across said windshield-roof joint in a substantially smooth manner along the entire length of said joint; and
   (c) a roof fairing disengageably mounted on said cab roof and including a forward section thereof extending upward and rearward from the top of said forward roof section so as to define a forward roof-fairing joint therebetween, said forward roof section and forward fairing section together presenting a combined forward roof-fairing surface which extends upward and rearward across said forward roof-fairing joint in a substantially smooth manner along the entire length of said last-mentioned joint; and
   (d) said cab roof, said roof fairing, hood and windshield including opposite side sections which diverge rearwardly in generally symmetrical relationship to one another and, if executed, would meet at rearwardmost opposite edges of the truck cab.

26. The improvement according to claim 25 wherein said truck includes a frontmost grille and wherein said diverging side sections of said hood extend from opposite sides of grille to their rearwardmost back edges.

27. The improvement according to claim 5 when said cab roof includes opposite upwardly extending side sections located rearwardly of its forward section and rearwardly of said windshield, and wherein said roof fairing includes opposite side sections, each of which extends upward from a corresponding one of said roof side sections so as to define a side roof-fairing joint therebetween, each of said side roof section and corresponding side fairing section together presenting a combined roof-fairing surface which extends upward across its side roof-fairing joint in a substantially smooth manner along the entire length of said last-mentioned joint.

28. The improvement according to claim 4 wherein each of said rearwardmost opposite edges of said truck cab extend vertically in a substantially continuous manner.

29. In a truck including a truck cab, the improvement comprising:
   (a) a front windshield;
   (b) a cab roof located above said windshield and including a forward section thereof extending upward and rearward from the top of said windshield; and
   (c) means serving solely as a roof fairing disengageably mounted on said cab roof and including a forward section thereof extending upward and rearward from the top of said forward roof section so as to define a forward roof section and forward fairing section together presenting a combined forward roof-fairing surface which extends upward and rearward across said forward roof-fairing joint in a substantially smooth manner along the entire length of said last-mentioned joint;
   (d) the length of said roof fairing from its front end to its back end is approximately equal to the maximum height of said cab from its bottom edge to the top of its roof and wherein said truck includes means for supporting said fairing in an upstanding position to and immediately behind said cab in the event the truck must be decked in order to be towed.

* * * * *